Dec. 19, 1967  P. T. W. CHISHOLM  3,358,755
MULTIPLE CLOSED IN PRESSURE SAMPLING
APPARATUS AND METHOD
Filed July 27, 1965  3 Sheets-Sheet 1

INVENTOR
PAT T. W. CHISHOLM
BY Burns, Doane, Benedict, Swecker, & Mathis
ATTORNEYS

INVENTOR
PAT T. W. CHISHOLM
ATTORNEYS

United States Patent Office 3,358,755
Patented Dec. 19, 1967

3,358,755
MULTIPLE CLOSED IN PRESSURE SAMPLING
APPARATUS AND METHOD
Pat T. W. Chisholm, Alice, Tex., assignor to Halliburton
Company, Duncan, Okla., a corporation of Delaware
Filed July 27 1965, Ser. No. 475,093
6 Claims. (Cl. 166—3)

ABSTRACT OF THE DISCLOSURE

Apparatus and method for obtaining samples of well fluid where fluid is entrapped in an annular zone and removed centrally and axially of the zone.

While the annular body of sample fluid is being moved through a well bore, a centrally and axially disposed valve mechanism, through which the sample to be removed, is radially shielded.

*General background and objects of invention*

This invention relates to methods and apparatus for use in wells. In particular it relates to methods and apparatus which are employed to obtain and retrieve samples of well fluids.

The art of obtaining samples of well fluids for analysis purposes is well developed. All this notwithstanding, practical difficulties are still encountered in many well fluid sampling operations.

The structural complexity of many well fluid sampling tools is such as to make these tools vulnerable to damage during operation, difficult to maintain, and vulnerable to failure under adverse operating conditions.

Past experience in connection with well fluid sampling tools has also indicated the desirability of improving and simplifying the procedures and structures employed in removing an entrapped sample from a sample confining chamber.

Past experience also indicates that it would be desirable to provide a well fluid sampling tool in combination with operating mechanisms which would provide an operator at a well head with more positive indications of the disposition of sampling tool components within a well during a sampling operation.

In recognizing the need for an improved well fluid sampling and retrieving tool, it is a basic object of the present invention to provide improved methods and apparatus for obtaining samples of well fluid which substantially eliminate or minimize operational problems such as those above suggested and fulfill the needs above noted.

It is a particular object of the invention to provide such methods and apparatus which are characterized by overall simplicity, operational reliability, speed of operation and ruggedness.

It is likewise an object of the invention to provide such methods and apparatus which contribute to ease of fabrication and maintenance of testing tools.

A still further object of the invention is to provide such methods and apparatus by means of which a fluid sample may be positively and easily entrapped within a sampling chamber disposed in a well bore, easily and safely removed from the well, and easily and safely removed from the sampling tool for analysis purposes.

Yet another object of the invention is to provide such methods and apparatus by means of which a sample may be trapped within a well bore under the pressure existing in the flowing well fluid, and which serve to effectively maintain the trapped sample under this pressure until the sample is removed from the apparatus for analysis purposes.

Other objects of the invention are to provide such methods and apparatus which afford positive control over the sequence of manipulation of operation of tool components and which yield positive indications at a well head of the completion of component manipulations.

In accomplishing at least some of the foregoing objectives, there is presented through this invention a method of obtaining and retrieving samples of well bore fluids, which method involves the sealing of an annular zone within a well. A sample of flowing fluid initiating below this sealed annular zone is confined in an annular configuration at substantially the pressure of the flowing fluid before confinement. The confined fluid sample is raised toward a well head for a predetermined distance while maintaining the sealing of the annular zone. Thereafter, the raising of the sample is continued and fluid in the well is permitted to flow generally transversely inwardly and then axially downwardly beneath the confined sample. The confined fluid is removed by causing the fluid to flow generally transversely inwardly of and then axially outwardly of the annular sample configuration.

An individually significant method facet of the invention involves the steps of the overall method noted above which entail the confining of a sample of fluid in an annular configuration and the removal of this sample by causing the fluid to flow generally transversely inwardly of and then axially outwardly of the annular configuration.

Individually significant apparatus aspects of the invention involve combinations of means for performing the steps involved in the two methods noted above.

An apparatus concept of particular significance involved in the invention relates to a combination which includes well fluid receiving chamber means and first, axially slidable, valve means for selectively opening and closing this chamber means. Axially movable operating means are included in the combination for operating the first valve means. This operating means includes elements movable in response to the imposition of axial force on conduit means supporting the apparatus within a well.

Passage means included in the combination provide a flow path for well fluids and extend generally axially of the apparatus combination. Port means provide communication between this passage means and the exterior of the apparatus.

The combination further includes second, axially slidable, valve means adapted to be moved axially by the first valve means to close the port means.

Axially extensible coupling means and a packer assembly are also included in the combination. The packer assembly is adapted to sealingly engage a peripheral portion of a well. The axially extensible coupling means is disposed between the packer assembly and the first valve means.

A still further individually significant apparatus aspect of the invention relates to structural details of the first valve means included in the overall combination above described. This first valve means comprises barrel means and mandrel means disposed for axial sliding movement within the barrel means. Portions of this barrel means and mandrel means cooperate to define the chamber means of the overall combination. Passage means in the mandrel means may serve to provide communication between the chamber means and the exterior of the assembly. This valve means structure further includes control means, carried by the slidable mandrel means, and disposed to control flow through the passage means thereof.

Other structurally significant facets of the invention relate to structural details of the barrel means, mandrel means, passage means and flow control means above noted.

Inventive significance is also attached to a structural combination including the above-noted valve means and axially slidable actuating means for inducing axial slidable movement of the mandrel means of the valve means. The actuating means is operable in response to the imposition of axial force on conduit means supporting apparatus within a well. The actuating means includes movement control means for impeding downward movement of the actuating means for a predetermined initial portion of the axial travel of the actuating means and for permitting a terminal portion of this downward axial travel to occur without this impeding action.

In describing the invention, reference will be made to a preferred embodiment illustrated in the accompanying drawings.

In these drawings:

FIGURE 3 schematically illustrates the elements of the FIGURE 1 combination disposed so as to block the axial flow of well fluid through the apparatus so that the pressure of formation fluids under non-flowing conditions may be recorded. FIGURE 3 further illustrates the disposition of combination elements which serve to entrap a sample of formation fluid at the pressure which it had while flowing through the apparatus;

*Principal components of the apparatus*

Figure 1:
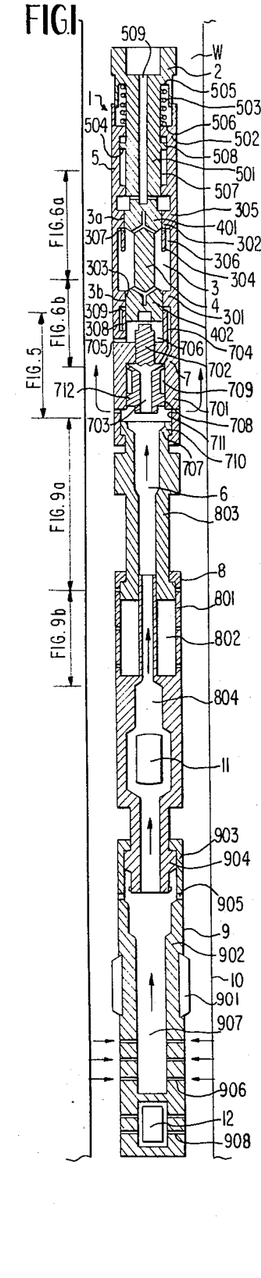
FIGURE 1 schematically represents an assembly of elements adapted to be supported on a conduit string in a well bore and to be utilized to obtain and retrieve a formation sample and record the pressures of this sample fluid. The elements of the combination are schematically shown in FIGURE 1 in the general posture which they would maintain while the apparatus was being lowered into a well bore.

FIGURE 1 schematically illustrates an assembly to be utilized in well testing operations. This assembly 1 may be employed to collect samples of flowing well fluids and confine these samples under the pressure at which the well fluid was flowing at the time of its entrapment. Additionally, the apparatus 1 may be employed to measure the pressure of formation fluids.

Apparatus 1 includes a coupling portion 2 at its upper end. Coupling portion 2 may be threaded or provided with other conventional fastening means for securing the apparatus 1 to the lower end of a conventional conduit string. Thus, the apparatus 1 may be supported on the lower end of a conduit string and moved axially down and up within a well bore.

Apparatus 1 includes a well fluid receiving, generally annular chamber 3 and an axially slidable spool-type valve 4 which serves to simultaneously open or close central openings 3a and 3b at the upper and lower ends, respectively, of the chamber 3.

As schematically shown, annular sample receiving chamber 3 is defined by a generally cylindrical or barrel-like housing 301 and the outer periphery of the spool valve 4.

Housing 301 includes an upper, generally cylindrical valving surface 302 which defines the central opening 3a. This housing also includes a lower, generally cylindrical valving surface 303 which defines the lower aperture 3b of the sampling chamber 3. A piston-like upper end 401 of the valve slidably and sealingly engages the surface 302. A piston-like lower end 402 of the valve slidably and sealingly engages the valving surface 303.

Valving surface 302, at its lower end, is defined by a sleeve-like portion 304. Sleeve-like portion 304, which has a lower free end, is spaced radially inwardly of a cylindrical wall portion 305 of the housing 301 so as to define an annular downwardly opening recess or passage 306. This recess communicates with the sample chamber 3. One or more radial ports 307 at the upper end of the sleeve 304 provide communication between the sample chamber 3 and the upper sample chamber outlet 3a, via recess 306, when the upper piston-like end 401 of the valve 4 is moved downwardly beneath the ports 307.

Second sleeve-like portion 304a, spaced radially inwardly from a second cylindrical wall portion 305a, defines a second generally annular passage 308 in the lower end of the housing 301. This passage is adapted to communicate with the chamber 3 through one or more radial ports 309 formed in the sleeve 304a.

Axially movable operating means 5 are superposed above and connected with the valve 4. This operating means is connected through coupling 2 with the supporting conduit string previously noted but not illustrated.

Operating means 5 may desirably comprise a movement control device such as that described in United States Schwegman Patent No. 2,740,479. The basic elements of this mechanism comprise a stem 501, a housing 502 which telescopingly receives the stem 501, coil spring 503 and hydraulic, movement impeding device 504.

As schematically shown in FIGURE 1 and as described fully in the Schwegman patent, the coil spring 503, engages at its upper and lower ends, abutment surfaces 505 and 506. These surfaces are connected to the housing 502 and the stem 501 as shown so as to impede downward telescoping movement of the stem 501 relative to a stationary housing 502.

Movement control mechanism 504, as schematically shown in FIGURE 1 and as fully illustrated and described in the Schwegman patent, comprises an arrangement of restricted flow passages, check valve means, and bypass ports which causes the stem 501 to undergo initial downward movement relative to the housing 502 against a counteracting, impeding force. This counteracting force results from a restriction to flow of hydraulic fluid within a cavity 507 provided by an annular barrier 508 carried by the stem 501. This barrier contains restricted flow passages which impede the ability of the barrier 508 to displace fluid within the cavity 507 from the top to the bottom of the barrier as the stem moves downwardly. As described in the Schwegman patent, a bypass arrangement enables this hydraulic fluid to bypass the flow restricting barrier 508 after the stem 501 has moved down a predetermined axial distance. Thus, during a terminal portion of the downward axial travel of the stem 501, the stem moves without the above noted impeding action. Check valve means described in the Schwegman patent enable unimpeded upward movement of the stem 501.

The point where the impeding action of the movement control mechanism 504 is discontinued is selected so as to coincide with the point where the valve 4 has moved sufficiently downwardly to open the central passages 3a and 3b of the sample chamber 3.

When the valve 4 has moved downwardly to this open position, an operator of the tool at a well head will note a difference in the force required to cause downward movement of the conduit string engaged with the stem 501. In this manner, a positive well head indication is provided of the state of operation of the valve 4.

Passage means 6 provide a flow path for well fluids within the apparatus. Passage means 6 extends generally axially of the apparatus and includes an axial passage 509 in the stem 501. This passage 509 communicates with the interior of an apparatus supporting conduit string. Passage means 6 additionally includes a series of passages and ports to be hereinafter described which, when the valve 4 is in the open valve position, provide a generally continuous flow path extending axially through most of the length of the apparatus shown in FIGURE 1.

As will be appreciated, annular passage 308, ports 309, chamber 3, annular passage 306, and ports 307 comprise a portion of the passage means 6.

A second axially slidable valve 7 is mounted in the apparatus 1 immediately beneath the first valve 4. This second valve means 7 comprises a generally cylindrical housing 701 and a central, axially slidable, valve member 702 disposed within the housing 701. Valve means 7 comprises a valve arrangement such as that fully described in the United States Chisholm Patent 3,105,553.

As fully described in the Chisholm patent and as schematically shown in FIGURE 1, valve element 702 includes a central passage 703 which continuously communicates with passage means 704 in housing 701. Passage means 704 communicate with opening 3b of sample chamber 3 and defines a portion of the passage means 6.

Annular passage 308 communicates with passageway 704 of the valve means 7 as schematically shown. Thus, with the valve 4 moved downwardly to such an extent as to move the piston-like lower valve end 402 beneath the ports 309, well fluid flowing through the passage 704 may flow through the ports 309 and into the chamber 3 and then through the ports 307 and into the passageway 509.

The upper end of valve 702 is in continuous communication with well fluids contained in an annular space A between the well wall and the outer periphery of the apparatus 1 and above an expanded packer, to be subsequently described. This continuous communication is provided by one or more radially extending ports 705 which intersect the housing 701 and extend to a cavity 706 housing the upper end of the valve 702 and into which the lower end of the valve 4 is axially projectable.

As described fully in the Chisholm patent and schematically shown in FIGURE 1, a generally cylindrical portion 707 of the apparatus is telescopingly retained by the lower end of the main valve means housing 701. When the housing 701 is telescoped downwardly, relative to portion 707, a lower annular surface 708 of a valve receiving passage 709 moves into close proximity with an annular valving surface 710 at the upper end of the portion 707. The surfaces 708 and 710 are then disposed, respectively, above and below one or more radially extending ports 711 in the housing 701. An annular seal portion 712 carried by the valve 702 is adapted to sealingly engage the converge surfaces 708 and 710 so as to close the ports 711 and thus prevent fluid flow between the well bore annulus and the passage means 6 through the port means 711.

As described in the Chisholm patent, when the valve 702 is moved downwardly so as to sealingly engage the surfaces 708 and 710 and close the ports 711, the valve 702 is placed in a hydraulically downwardly biased condition. This biasing results from the fact that the upper end of the valve 702 is exposed to annulus pressure through the ports 705 while the lower end of the valve 702 is not exposed to this annulus pressure as a result of the closing of the ports 711.

In this connection, it will be understood that under normal operating conditions, annulus pressure will exceed the pressure of flowing well fluids passing axially through the tool. It will also be understood that fluids providing this annulus pressure are isolated from formation fluids passing through the tool by conventional packer means to be hereinafter described which are carried at the lower end of the apparatus 1.

As described in the Chisholm patent, the hydraulic biasing effect on the valve 702 may be removed by raising the housing 701 relative to the telescoping member 707. When this occurs, the annular seal portion 712 of the valve 702 is moved out of sealing engagement with the surface 710 so as to allow annulus pressure to communicate with the lower end of the valve 702 via the now open ports 711. This offsetting of the downward biasing force above noted will enable a coil spring 713, shown in FIGURE 5, to automatically return the valve 702 to the upward position shown in FIGURE 1. This automatic return and hydraulic balancing concept is fully described in the aforenoted Chisholm patent.

Downward movement of the valve 702 is caused by downward movement of the valve 4 sufficient to bring the lower end of the valve 4 into engagement with the upper end of the valve member 702. Thus, downward movement of the conduit string supporting the apparatus 1, under the control of actuating or operating means 5 serves to open the passages 3a and 3b in the sample chamber 3 and to close the ports 711.

Apparatus 1 additionally includes axially extensible coupling means 8. Coupling means 8, as schematically shown in FIGURE 1, may comprise a lower portion 801 which defines a generally annular and upwardly opening recess 802. This recess telescopingly receives and retains (by appropriate and conventional abutment means) an upper, generally cylindrical member 803. As illustrated, member 803 is connected with element 707 of valve means 7.

Apparatus 1 also includes, at its lower end, a combination packer and valve mechanism 9.

Mechanism 9, as schematically shown in FIGURE 1, may comprise conventional and commercially available composite mechanisms utilized to grippingly and sealingly engage a well bore periphery. Such mechanisms conventionally include elastomeric, annular seal units such as the schematically shown unit 901. This unit may be expanded radially from a contracted position shown in FIGURE 1 to the configuration shown in FIGURE 2 where the element sealingly engages the periphery 10 of a well W.

As will be understood by those skilled in the oil tool art, the radial expansion and contraction of the packer 901 results from appropriate manipulations of the conduit string supporting the apparatus. Such manipulations are usually made possible by the incorporation of drag shoes or drag springs on the housing 902 of the packer assembly 9. Such drag shoes or drag springs, being conventional in character, are not illustrated. It will be understood, however, that they engage the well wall 10 so as to provide a resistance to downward movement of some of the actuating components of the mechanism 9 which serve to induce radial expansion or contraction of the packer element 901 in response to axial movement of the apparatus supporting conduit string.

The packer and valve assembly 9 may also include a generally cylindrical and radially ported, upper portion 903 which telescopingly receives an inner, generally cylindrical valving member 904. As will be hereinafter described, member 904 may be moved down from the position shown in FIGURE 1 so as to close ports 905 in the housing 903. In a conventional fashion, a J-slot, lug and slot interconnection may be provided between the telescoping valving members 904 and 903. This J-slot permits axial movement of the member 904 relative to the member 903 only after the conduit string has been rotated a predetermined extent from a locked position. During such rotation, the drag shoes or drag springs on the housing 902 prevent movement of the valving member 903.

The J-slot connection, in the usual fashion, may comprise a slot carried by one of the elements 904 or 903 and a lug slidably disposed within this slot and carried by the other of these interconnected elements. The slot of this connection would usually include a generally laterally extending section which communicates with a vertically extending section. While the lug is disposed in the horizontal section, rotational but not vertical movement between the elements 903 and 904 is possible. When the lug is disposed in the vertical section of the slot axial but not rotational movement between these elements is possible.

As shown in FIGURE 1, the axially extensible coupling means 8 is disposed in the apparatus 1 between the packer and valving assembly 9 and the valving mechanism 4 associated with the sample chamber 3.

The apparatus schematically shown in FIGURE 1 includes a conventional well fluid pressure recorder 11 disposed in an axial passage 804 of the axially extensible coupling means 8. Passage 804, as shown, comprises a portion of axial passage means 6.

Communication between a formation being evaluated and the passage means 6 may be provided by one or more radial ports 906 in the packer assembly 9. These ports, which are disposed beneath the packer element 901, communicate with a central passage 907 of the packer assembly 9, which passage also forms a portion of the overall passage means 6.

The apparatus may also include a second, conventional well fluid pressure recorder 12 carried in the lower end of the apparatus 1 as schematically shown. One or more ports 908 may provide communication between well fluids and the recorder 12.

It will be understood, of course, that ports 906 and 908, in being disposed beneath the packer 901, communicate with fluid flowing from a formation beneath the expanded packer element 901 and through an annular well space B beneath this expanded packer upwardly to the packer assembly.

*Basic mode of operation of tool*

In describing the mode of operation of the overall apparatus 1, reference will be made to the schematic showing of the apparatus components provided by FIGURES 1 through 4.

FIGURE 1 illustrates the apparatus 1 with its elements arranged as they would be disposed as the apparatus 1 is being lowered into a well bore. During this lowering process, the valuable ports 905 and 711 remain open. Thus, fluid may circulate freely through the portion of the passage means 6 between the valve ports 905 and 711 during the lowering operation so as to minimize the resistance to lowering imposed by fluids within the well.

During the running-in or lowering phase, the stem 501 is raised to its uppermost position relative to the housing 502, the valve 4 is disposed so as to close the passage 3a and 3b of the chamber 3, the housing 701 of the valve means 7 is in its raised position relative to the telescoping portion 707 of this valve means, and the upper element 803 of the coupling 8 is in its raised position relative to component 801 of this coupling.

Rotation of the interconnected stem 501 and valve 4 relative to the interconnected housings 502 and 701 and the housing 301 is prevented by conventional spline connections, hereinafter described. A conventional spline interconnection, also subsequently described, between the elements 707 and 701 prevents relative rotation between these components of the apparatus. Polygonal cross sectional configurations of mating, telescoping portions 803 and 801 of the coupling means 8, as later noted, prevent relative rotation of these elements of the apparatus.

As will thus be appreciated, with the non-rotational relationship between elements above described, torque may be transmitted from an apparatus supporting conduit string to the operating means 5 and from this operating means to the valving member 904 of the packer and valve assembly 9.

Figure 2:
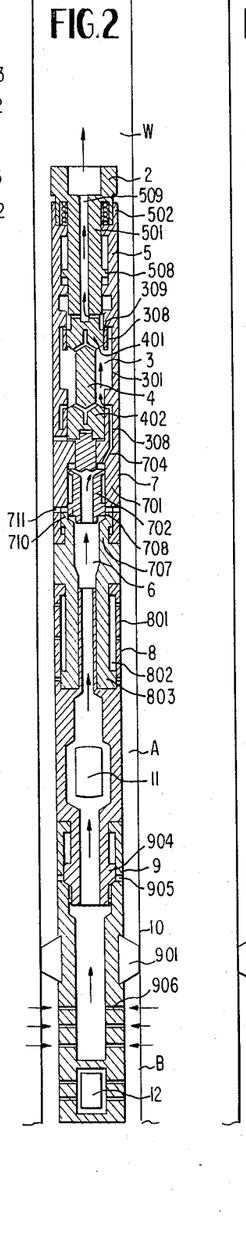
FIGURE 2 schematically illustrates the combination of FIGURE 1 after a packer portion of the combination has been engaged with a well bore periphery to define a sealed annular zone above the packer and illustrates the elements of the combination thus disposed to allow an axial flow of formation fluid from beneath the expanded packer, through the interior of the tool, and into the interior of a supporting conduit string.

FIGURE 2 schematically illustrates the arrangement of components of the apparatus 1 after the packer 901 has been expanded into sealing engagement with the well periphery. In the arrangement shown in FIGURE 2, the expansion of the packer 901 and associated well wall gripping elements, not shown, into engagement with the well wall 10 has immobilized the housing 902 of the packer and valving assembly and thus immobilized the lower end of the apparatus 1 relative to the well bore. This immobilization would be achieved by well known manipulations of the conduit string supporting the apparatus which would serve to set the packer elements of the assembly 9 in a conventional fashion.

With the apparatus disposed as shown in FIGURE 2, it defines an upper annular space A within the well and above the packer 901 and a lower annular space B within the well, beneath the packer 901, and disposed between the well wall 10 and the outer periphery of the apparatus 1.

FIGURE 2 also illustrates the apparatus components after the apparatus supporting conduit has been moved downwardly a sufficient distance relative to the anchored and set packer assembly 9 so as to depress the valve 4 relative to the housing 301 and allow flow through the sample chamber apertures 3a and 3b into the axial passage 509.

The movement controlling mechanism 504 is disposed relative to the valve 4 so that the movement impeding force provided by this mechanism ceases when the valve 4 has moved downwardly to an open valve position shown in FIGURE 2. The cessation of this movement impeding force will, of course, be discernible at the well head inasmuch as a reduced downward force will be required to induce further downward movement of the conduit supporting the apparatus. Thus, an operator will be able to determine at the well head when the conduit string has been moved downwardly to an extent sufficient to open the chamber 3. This mode of utilization of the mechanism 504 is more fully described in the previously noted Schwegman Patent No. 2,740,479.

In depressing the conduit string 2, so as to dispose the valve 4 relative to the housing 301 as shown in FIGURE 2, the housing 701 will have moved downwardly relative to the valve member 707 to assume the converged position shown in FIGURE 2. In addition, the lower end 402 of the valve 4 will have engaged and depressed the valve member 702 so as to have moved the valve seal 712 into sealing engagement with the axially converged surfaces 710 and 708 so as to have closed the ports 711.

Further, the downward movement of the conduit string 2 will have moved the upper member 803 of the telescoping coupling downwardly into the recess 802 so as to have converged or telescopingly collapsed the elements 803 and 801 of the coupling means 8.

It should also be noted that in setting the packer 9, the packer member 904 will have been rotated and moved downwardly relative to the member 903, as permitted by the configuration of the previously described conventional J-slot so as to allow the valving, sleeve-like element 904 to move downwardly and close the ports 905.

By reference to FIGURE 2, it will be appreciated that the elements of the apparatus are there arranged to allow well fluid to flow through the ports 906, into the passage means 6, and entirely through the tool to the interior of the conduit string supporting the apparatus. The closed ports 711 and 905 prevent fluids in the well annulus above the expanded packer 901 from communicating with or entering the passage means 6.

While the apparatus 1 is disposed as shown in FIGURE 2, the recorders 11 and 12 will continuously meter and record the pressure of fluids from a formation being tested, which formation is located beneath the expanded packer 901.

Figure 3:
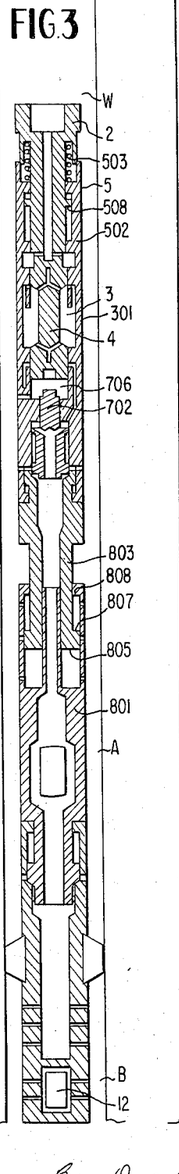

FIGURE 3 illustrates an arrangement of apparatus components which results from the limited raising of the apparatus supporting conduit string. This limited raising closes the chamber 3 and closes the passage means 6 by moving the valve ends into closing alignment with the chamber apertures 3a and 3b.

By merely exerting an upward force on the apparatus supporting conduit string, when the apparatus is disposed as shown in FIGURE 2, the stem 501 is raised so as to raise the valve 4 and close the chamber passages 3a and 3b.

When a lifting force is initially imposed on the conduit string sufficient to raise the stem 501, the stem 501 will move upwardly along with the valve 4 while the unitized housings 502, 301 and 701 will remain stationary.

The holding of the integrated housings 502, 301 and 701 in a stationary posture during the initial raising of the valve 4 results from the restoring effect of the spring 503 and from the pressure biasing effect of the annulus fluid above the packer 901. This annulus fluid will exert a raising force on the lower end of valve member 402 so as to tend to bias the valve upwardly. This same pressure acting through the ports 711 will exert a downward force on the housings in the chamber 706 so as to tend to immobilize these housings while the valve 4 is moving upwardly.

After the stem 501 has been raised to its uppermost position as determined by abutment means included in the mechanism 5, the valve 4 will have moved to a position to close the chamber openings 3a and 3b and thus entrap an annularly configured fluid sample in the chamber 3. (Such abutment means, although not shown in FIGURE 3, are fully illustrated and described in the previously noted Schwegman patent.) As will be appreciated, the valve closing occurs while the well fluid is flowing through the passage means 6. Thus, the closing of the valve in response to the raising of the conduit string will trap a fluid sample in the chamber 3 with the sample being at the pressure of the flowing fluid.

After the valve 4 has been moved to its uppermost, sample chamber closing position, continued upward movement of the conduit string 2 will serve to move the upper member 803 of the coupling means 8 upwardly through the cavity 802. Fluid pressure acting on an annular reaction surface 805 at the lower end of the member 803 will tend to hold the portions 701 and 707 of the valve means 7 in the relationship shown in FIGURE 2, while the member 803 moves upwardly through the cavity 802. The pressure acting on the surface 805 is supplied by annulus fluids above the packer 9 which enter the chamber 802 through one or more radial ports 806 in the housing 801.

After the member 803 has been moved upwardly through its maximum axial travel, as determined by engagement of an abutment 807 carried by the member 803 with an abutment 808 carried by the housing 801, continued upward movement of the conduit 2 will then move the unitized housings 502, 301 and 701 upwardly, with the coupling member 803 being held immobile by the member 801. This continued upward movement of the housings will move the valve seal 712 out of sealing engagement with the surface 710 so as to allow annulus pressure to once again react on the lower end of the valve member 702. In other words, the ports 711 will be uncovered so as to allow annulus fluids to enter the passage means 6 and act upon the lower end of the valve 702 so as to cause this valve to move upwardly and resume the position shown in FIGURE 1.

When the valve 4 has been closed, an operator at the surface will note that an augmented lifting force will be required to continue the raising of the conduit string supporting the apparatus. This augmented force will result from factors including the no longer effective restoring force of the spring 503 and a necessary additional lifting force required to raise the element 803. In addition, the lifting force which acted on the lower end of the valve 4 so as to assist in its raising will be offset by a downward force acting on the unitized housings 502, 301 and 701 in the chamber 706. Thus, the operator will be able to detect immediately when the raising of the string supporting the apparatus has closed the valve 4 and commenced to raise the element 803.

By knowing the extent of axial travel of the element 803 relative to the element 801, an operator can limit the upward movement of the apparatus supporting string so as to terminate the lifting of the string while the elements of the coupling means 8 are disposed as shown in FIGURE 3, i.e. before the element 803 has reached its upper travel limit within the cavity 802. With the elements thus disposed, the valve 702 remains in a position closing the ports 711. Thus, if desired, without opening the ports 711, an operator may move the apparatus supporting conduit string up and down repeatedly. In this fashion, a sequence of pressure readings may be obtained by the recorders 11 and 12 which will reflect the extent to which pressure increases within the passage means 6 and well annulus beneath the packer 9 when flow through the apparatus is interrupted. This type of pressure recording may be repeated as often and as rapidly as desired by merely causing the apparatus supporting conduit string to undergo appropriate, limited axial movement.

Figure 4:
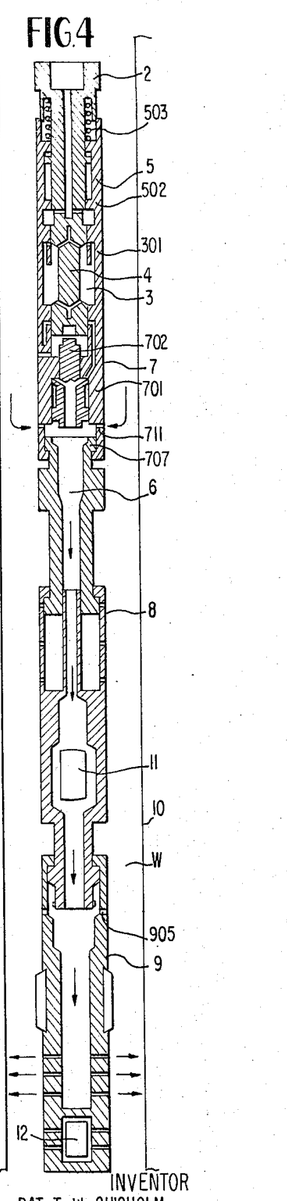
FIGURE 4 schematically illustrates the elements of the FIGURE 1 combination as they are disposed after the packer has been retracted and while the apparatus is being raised to a well head.

After the desired readings have been obtained and a sample entrapped in the chamber 3, the tool elements may be restored to the condition shown in FIGURE 4 (which is the same disposition of elements as that shown in FIGURE 1) and the apparatus 1 raised to the well head.

It should be noted that in raising the conduit string sufficiently to cause the opening of the ports 711, the operator of the tool at the well head will be able to detect the necessity for exerting an increase in lifting force. This increased lifting force will result from the engagement of the abutment surfaces 807 and 808, which will obviate the lifting thrust provided on the upwardly moving components by the action of annulus pressure on the surface 805.

After the conduit string has been raised sufficiently to close the chamber 3, extend the coupling means 8, and open the ports 711, the string may be additionally raised and manipulated so as to raise the member 904 and open the ports 905. Additional and well understood conventional manipulations of the apparatus supporting string may then be effected to cause the radial contraction of the well bore gripping and sealing elements of the packer assembly 9. With the packer assembly 9 thus freed from the engagement with the well, the entire apparatus may be drawn upwardly to the well head.

As the apparatus 1 is drawn upwardly through a well bore, annulus fluid may circulate into the ports 711, through the passage means 6, and out of the ports 906. This circulation through the tool may offset fluid resistance encountered during the raising operation and minimize the lifting force required to raise the tool to the well head.

Viewing FIGURES 3 and 4 jointly, it will be apparent that after a fluid sample has been trapped in the chamber 3, this sample will be moved upwardly with the housings 502, 301 and 701 for a predetermined distance until the ports 711 are open. After these ports have been opened and while these housings and the fluid sample are still being raised by the apparatus supporting conduit string, well fluid in the annulus A will flow generally radially inwardly into the passage means 6 and then axially downwardly through this passage means beneath the sample in the chamber 3.

It will also be apparent that until the ports 711 are opened, the annular zone A within the well will be sealed by the sealing action of the packer 901 and the closed character of the ports 711. The term "sealing" as here used, of course, refers to the containing of fluid within the annulus A so as to prevent this fluid from flowing downwardly either through the apparatus 1 or past the packer 901.

At the well head, the fluid sample retaining components of the apparatus may be removed from the apparatus and transported to a laboratory for sample fluid analysis and evaluation.

At the well head the recorders 11 and 12 may also be removed from the tool so that an evaluation may be made of the pressure recordings.

*Structural details and mode of operation of sample retaining unit*

FIGURES 6a, 6b, 7 and 8 illustrate structural details of components of the apparatus 1 and related handling equipment which may be utilized at a well head to provide a safe vehicle, detached from the apparatus 1, for handling and transporting the sample fluid sample containing chamber 3.

Figures 6A, 6B, 7, 8:
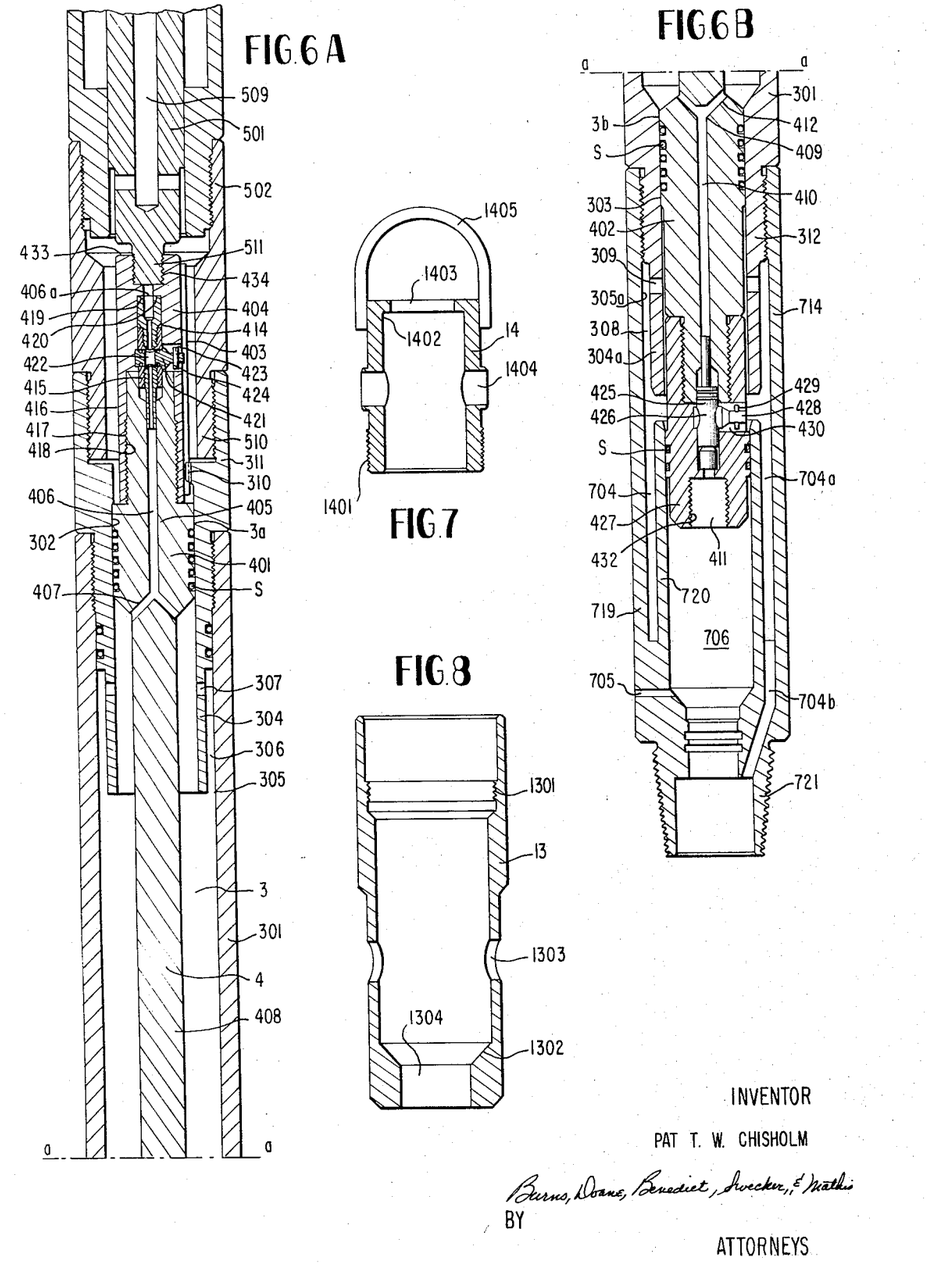
FIGURES 6a and 6b, when joined along the connecting line a—a, provide an enlarged, sectioned, and vertical, elevational view of a portion of the FIGURE 1 assembly and illustrate structural details of a mandrel and barrel assembly which serves to define a well fluid entrapping chamber.
FIGURE 7 is a schematic sectioned, vertical, elevational view of a cap which may be secured to the upper end of the mandrel and barrel components shown in FIGURES 6a and 6b when these components are removed from the apparatus at a well head.
FIGURE 8 is a schematic, sectioned and vertical, elevational view of a cap which may be secured to the lower end of the mandrel and barrel components shown in FIGURES 6a and 6b after these components have been removed from the FIGURE 1 assembly.

As shown in FIGURE 6a, and as previously indicated, the interconnected valve 4 and stem 501 are splined to the interconnected housing 502, 301 and 701. This spline may comprise one or more lugs 310, each of which projects radially inwardly from the inner periphery of the housing 301 into longitudinally extending grooves 403 formed on the upper end 401 of the valve 4.

As shown in FIGURE 6a, the upper end of housing 301 is provided with a threaded coupling portion 311 which threadably connects the housing 301 to a threaded coupling portion 510 comprising the lower end of the housing 501.

The piston-like upper end 401 of the valve 4 includes a female threaded coupling portion 404 which is detachably connected with a threaded male coupling portion 511 at the lower end of the stem 501. As will thus be apparent, the stem 501 and the housing 502 may be threadably disengaged from the valve 4 and housing 301, respectively.

The lower end of the housing 301 includes a threaded coupling portion 312 which is threadably connected with a female coupling portion 714. Coupling portion 714, as will be subsequently described, comprises an upper portion of the valve means 7 and defines the chamber 706, previously noted.

As will now be apparent, the housing 301 may be detached from the valve means 7 and actuating means 5 after the apparatus 1 has been raised to the well head by undoing the above-described threaded fastening means. Similarly, the valve 4 may be detached from the stem 501 of the operating means 5 by unthreading the stem portion 511 from the coupling portion 404 at the upper end of the valve 4.

The upper and lower ends of the valve 4 are provided with first and second valved passage means.

First passage means 405 in the upper end of the valve 4 comprises a centrally disposed and axially extending passageway 406 which extends through piston portion 401 and has an open end 406a which discharges into an axial opening provided by the removal of the threaded coupling portion 511. One or more generally transversely extending passages 407 extend from the lower end of the axial passage so as to communicate with the chamber 3 within the annular space between the sleeve 304 and the outer periphery of the valve central portion 408.

As illustrated, valve central portion 408 is of lesser diameter than the valve piston portions 401 and 402 and extends between and connects these piston portions.

Second passage means 409 included in the lower end of the valve 4 comprises a passage 410 which extends centrally and axially of the piston portion 402. Passage 401 extends to an opening 411 at the lowermost end of the valve 4. One or more passages or ports 412 extend generally transversely from the upper end of the passage 410 so as to communicate with the sample chamber 3.

The passage means 406 and 410 are provided respectively with first and second flow controlling valve means.

First flow control valve means 414 is incorporated in axial passage 406. This valve means comprises a removable housing 415 which extends axially within the passage 406. Housing 415 may be secured by a valve cap portion 416 which has a threaded female coupling portion 417 which threadably engages a threaded male coupling 418 extending from the lower end of the piston 401. Cap 416, as schematically shown, may be provided with abutment means 419 which abuttingly engage abutment means 420 on valve housing 415 so as to hold the valve body 415 within the passage 406.

A rotary valve member 421 is transversely journaled in the housing 415 for rotation about an axis extending generally perpendicular of and intersecting the passage 406. As illustrated, valve 421 has a central passage 422. By appropriately rotating the valve 421, the passage 422 may be placed in either axial alignment or complete misalignment with the passage 406 so as to either permit or prevent flow through the passage 406.

A laterally facing opening 423 in the cap 416 provides a recess for housing an operating rod 424. As illustrated, operating rod 424 is secured to and extends transversely of a shaft-like extension portion of valve member 421. Operating member 424 is disposed entirely within the recess 423 such that the valve member 421 and its associated operating member do not project beyond the radially outermost limit defined by the outermost perimeter of the piston portion 401 of the valve 4.

Second valve means 425 as shown in FIGURE 6b is substantially identical to first valve means 414. Thus, as shown in FIGURE 6b, second valve means 425 comprises an elongate valve housing 426 secured by a threaded cap 427 to the lower end of the valve 4. Rotary valving member 428 is journaled in housing 426 so as to control flow through the passage 410.

A valve operating rod 429 is connected with the rotary valve member 428 and is housed within a cap recess 430 so as to be disposed within the radial outermost limits of the piston portion 402 of the valve 4.

After the valve 4 and housing 301 have been detached from the apparatus 1, cap means shown in FIGURES 7 and 8 may be attached to opposite ends of these components to positively secure the valve 4 within the housing 301. With the valve 4 thus positively immobilized, the valve, housing, and cap assembly may be safely handled while the fluid sample within the chamber 3 is withdrawn. However, in this connection it will be understood that the frictional resistance of the piston means 401 and 402 within the surfaces 302 and 303 are such as to adequately secure the valve 4 relatively to the housing 301 while these components are being detached from the overall apparatus 1.

FIGURE 8 illustrates a lower cap means 13 which may be secured to the lower end of the housing 301 after the coupling 714 has been detached. Coupling 714, of course, may be detached while the apparatus is supported in a vertically extending disposition above a well head by conventional supporting means.

Cap means 13 includes a threaded female coupling portion 1301 adapted to threadably engage a male coupling portion 312 of the housing 301. When the coupling portion 1301 and 312 are fully engaged, a generally annular shoulder 1302 will engage a lower shoulder 431 on the valve 4 so as to prevent downward movement of the valve 4 relative to the housing 301.

When the cap means 13 is thus disposed on the lower end of the housing 301, one or a plurality of transversely extending apertures 1303 will be aligned with the recess 430. Additionally, an axial opening or passage 1304 in the lower end of the cap means 13 will be aligned with the passage 411. Thus, fluid flowing through the passage 410 may pass through the cap passage 1304. In this connection, it will be understood that a fluid conduit, not shown, may be threadably attached to a threaded portion 432 at the lower end of the valve 4 so to define a temporary continuation of the passage 401 leading to either a source of sample displacing fluid or a receptacle or testing apparatus to receive the sample fluid itself.

The aperture 1303 aligned with the recess 403 will allow a conventional wrench to engage the handle 429 so that the valve 428 may be rotated and thus appropriately manipulated.

After the lower cap means 13 has been secured as above described, the housing 301 and valve 4 may be threadably disengaged from the housing 501, respectively. An upper cap means 14 may then be secured to the upper end of the housing 301 so as to engage and thus prevent upward movement of the valve 4 relative to the housing 301.

Cap means 14 includes a male threaded portion 1401 which is adapted to threadably engage a female coupling portion 311 of housing 301. When the cap means is thus engaged with the housing 301, an annular shoulder 1402 of the cap means 14 abuttingly engages an annular shoulder 433 at the upper end of the valve 4.

With the cap means 14 thus connected with the housing 301, an axial cap passage 1403 is axially aligned with the passage 406. A threaded portion 434 at the upper end of the passage 406 may be connected with a conventional threaded conduit setting so as to allow a conduit connected with the coupling portion 434 to extend axially through the aperture 1403 and thus define a temporary continuation of the passage 406.

With the cap means mounted on the housing 301, one of a plurality of radially extending apertures 1404 will be aligned with the recess 423. With this alignment, a conventional wrench type tool may be passed through the opening 1404 to engage the valve operator 424 and manipulate the valve 421.

The conduit connected with the coupling portion 434 may serve to either transmit sample displacing fluid into the chamber 3 or serve to transmit sample fluid to a sample fluid receptacle or sample fluid analyzing equipment.

As will thus be appreciated, fluid may be discharged from the chamber 3 by opening one of the valve means 421 or 429 in the valve 4 so as to allow fluid to be discharged under the influence of its own pressure. Alternatively, displacing fluid may be flowed into the chamber 3 through one of the open valve means of the valve 4 while sample fluid is displaced out of the other open valve means of the valve 4.

Regardless of how the sample is discharged from the apparatus, it will be appreciated that the fluid will flow first generally transversely inwardly from the annular passage 3 into one of the axial passages 402 or 410. Thereafter, the sample fluid will flow centrally and axially out of the apparatus, i.e. axially of the annular chamber 3.

In order to facilitate the removal of fluid from the chamber 3, the cap means 14 may be provided with a generally U-shaped handle 1405. This handle may be supported on conventional hook or suspending means so as to allow the housing 301 and valve 4 to be suspended during the sample fluid removing operation.

Miscellaneous structural details

As earlier indicated, portion 707 of the valve means 7 may be connected by conventional spline means to housing 701. Thus, as shown in FIGURE 9a, one or more lugs 701a carried by housing 701 may each project into a vertically extending groove 715 formed on portion 707 of the apparatus.

Figures 9A, 9B:
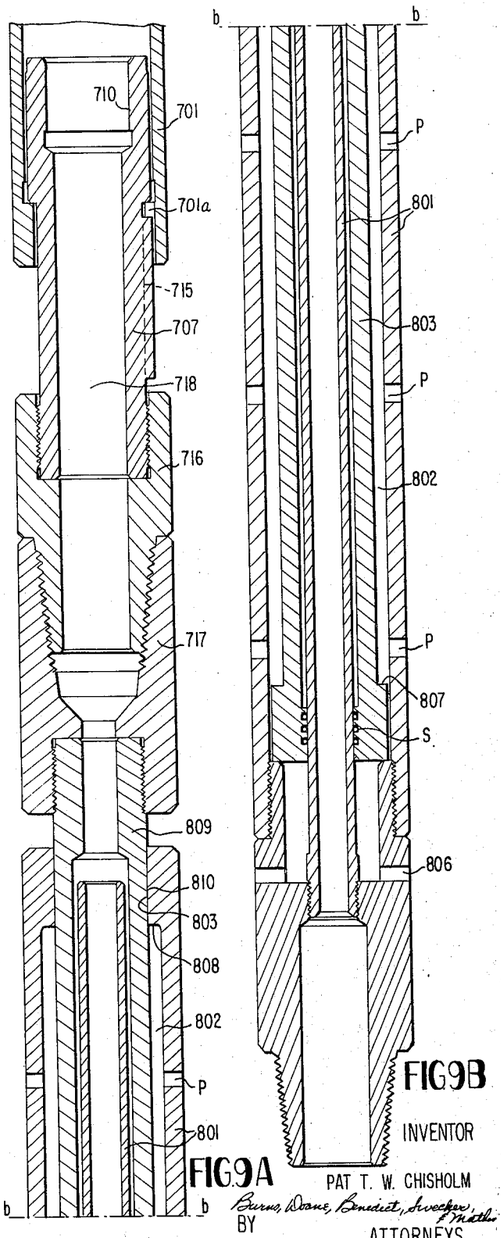
FIGURES 9a and 9b, when joined along the dividing line b—b, provide an enlarged, sectioned and vertical, elevational view of portions of the FIGURE 1 assembly comprising an axially extensible coupling disposed between a packer and the sample chamber structure shown in FIGURES 6a and 6b.

As is further shown in FIGURE 9a, threadably interconnected and generally cylindrical coupling portions 716 and 717 serve to detachably interconnect the valve means 7 and the member 803 of the extensible coupling 8. As illustrated, an axial passage 718 as defined by the members 707, 716 and 717, comprises a portion of the overall passage means 6.

As was also earlier indicated, the member 803 has a transverse cross section with a polygonal, outermost periphery 809. This polygonal periphery 809 slidably engages a mating polygonal inner periphery 810 on the upper end of the member 801. With these mating polygonal surfaces, rotation between the members 801 and 803 is effectively prevented.

Coupling portions 714 shown in FIGURE 6b includes radially spaced, generally cylindrical wall portions 719 and 720 which define a generally annular portion 704a of the previously noted passage 704. One or more passages 704b extends from the lower end of the annular passage portion 704a so as to place the lower end of the passage 704 in fluid communication with the passage 703 in the valve member 702 as schematically shown in FIGURE 5.

As illustrated in FIG. 6b, with the coupling portion 714 connected with the housing 301, the piston portion 402 of the valve 4 engages the surface 303 and the inner surface of the wall 720. In this fashion, the annular passages 704 and 308 provide, in essence, a continuous annular passage extending from the passage portion 704b to the ports 309.

Figure 5:
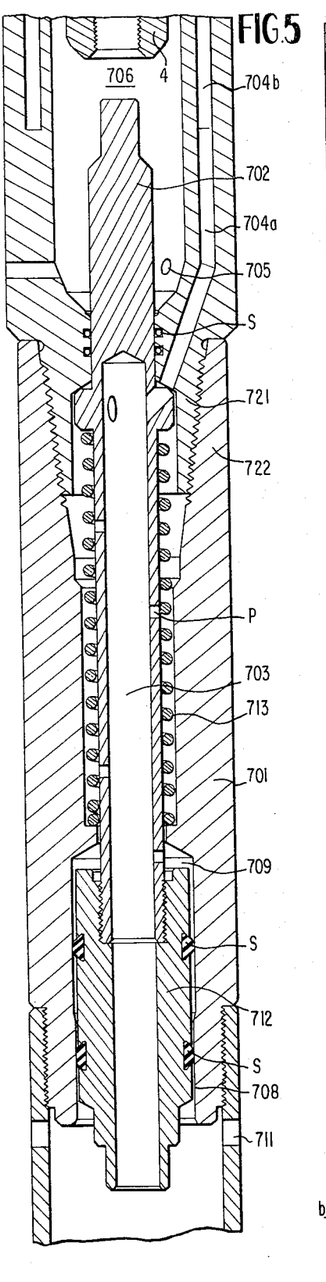
FIGURE 5 is an enlarged, sectioned, vertical, elevational view of a portion of the FIGURE 1 assembly illustrating, in greater detail, structural characteristics of a valve which serves to permit fluid to flow between the interior and exterior of the apparatus.

Coupling portion 714 may include threaded male coupling 721 at its lower end which threadably engages a female threaded coupling 722 in the upper end of the housing 701, as shown in FIGURE 5.

The apparatus 1 may be provided with conventional annular and elastomeric seals S and conventional vent ports P as schematically shown.

In general, the components of the apparatus illustrated in the appended drawings are generally cylindrical or tubular in character.

The generally utilized commercial embodiments of the elements of the apparatus would, for the most part, have circularly configured cross sectional configurations.

In order to describe the preferred embodiment of the apparatus without obscuring the inventive features, conventional structural details have been simplified. For example, those skilled in the oil tool art will recognize that many components of the apparatus have been shown as unitary components when in actual practice they would comprise a plurality of threadably or otherwise connected elements.

Advantages and scope of invention

In describing a preferred embodiment of the invention and its mode of operation, several advantages attendant upon the invention have been demonstrated.

For example, the valve 4 provides a structure which is characterized by a high degree of structural simplicity and operational reliability. The axial flow path arrangement in this valve contributes to ease of discharge of an entrapped well fluid sample. The relatively thin walled cylinder housing the sample is not weakened by the inclusion of venting mechanisms. In addition, the utilization of dual valved passage means at opposite ends of the valve 4 enables the valve 4 to be employed to either discharge sample fluids under the pressure of the sample from either end of the valve or to discharge the sample from either end of the valve by injecting a sample-displacing fluid medium.

The combination of the valve 4 and the housing 301 also provides a sample containing apparatus characterized by structural ruggedness, simplicity and operational dependability. The incorporation of handling or retaining cap means 13 and 14 with the valve 4 and housing 301 provides a uniquely effective and safe apparatus for handling a sample of high pressure well fluid for analysis purposes.

The overall combination of structural elements involved in apparatus 1 is characterized by dependability and reliability in performance as well as by structural simplicity and a positive, easy to control mode of operation. An operator at a well head may easily determine a condition of operation of the tool by noting changes in force required to manipulate an apparatus supporting, conduit string.

The essentially linear movements involved in the manipulation of the several valve mechanisms of the tool contribute to ease and rapidity of sampling operations. In addition, the apparatus enables an operator at a well head to maintain positive control over a testing operation inasmuch as the sequence of operation of axially movable components are readily predictable and ascertainable at the well head.

In describing the invention, reference has been made to a preferred embodiment. However, those skilled in the art will readily recognize that additions, deletions, substitutions or other modifications may be readily made with respect to this apparatus or its described mode of operation which would fall within the purview of the invention as defined in the appended claims.

I claim:

1. A method of obtaining and retrieving samples of well bore fluids, said method comprising:
    confining a sample of flowing well fluid within a well bore, with said fluid being confined at substantially the pressure of the flowing fluid before said confinement;
    transporting said confined fluid to a well head while maintaining said fluid in a substantially annular configuration;
    while transporting said fluid in said annular configuration, maintaining a closed outlet for said fluid disposed generally axially of said annular configuration and maintaining radial shielding between said outlet and the wall of said well bore; and
    removing said confined fluid by causing said fluid to flow generally transversely inwardly of and then axially outwardly of said annular configuration through said outlet.

2. Apparatus for obtaining and retrieving samples of well bore fluids, said apparatus comprising:
    means for confining a sample of flowing well fluid within a well bore, with said fluid being confined at substantially the pressure of the flowing fluid before said confinement;
    means for transporting said confined fluid to a well head while maintaining said fluid in a substantially annular configuration;
    outlet means selectively operable to discharge said confined fluid, said outlet means being disposed axially of said annular configuration;
    cylindrical shielding means disposed radially outwardly of and peripherally encircling said outlet means; and
    means for removing said confined fluid by causing said fluid to flow generally transversely inwardly of and then axially outwardly of said annular configuration through said outlet means.

3. An assembly for use in obtaining samples of well fluids, said assembly comprising:
    barrel means;
    mandrel means disposed for axial sliding movement within said barrel means;
    portions of said barrel means and said mandrel means cooperating to define isolated, fluid entrapping, chamber means;
    passage means in said mandrel means adapted to provide communication between said chamber means and the exterior of said assembly;
    valve means carried by said slidable mandrel means and disposed to control flow through said passage means; and
    cylindrical coupling and shielding means operable to disconnectably mount said barrel means and mandrel means in a well tool and define a continuation of said barrel means, peripherally and radially shielding said valve means.

4. An assembly for use in obtaining samples of well fluids, said assembly comprising:
    barrel means;
    mandrel means disposed for axial sliding movement within said barrel means;
    portions of said barrel means and said mandrel means cooperating to define isolated, fluid entrapping, chamber means;
    passage means in said mandrel means adapted to provide communication between said chamber means and the exterior of said assembly; and
    valve means carried by said slidable mandrel means and disposed to control flow through said passage means;
    said chamber means including a generally annular cavity disposed between an exterior portion of said mandrel means and an interior portion of said barrel means;
    said passage means including
        a first axial passage extending generally axially of and located at a first end of said mandrel means and communicating with the exterior of said mandrel means at said first end,
        first, generally transversely extending, passage means extending between said first axial passage and said chamber means,
        a second axial passage extending generally axially of and located at a second end of said mandrel means and communicating with the exterior of said mandrel means at said second end, and
        second, generally transversely extending, passage means extending between said second axial passage and said chamber means, and
    said valve means including
        a first rotary valve disposed in said first axial passage and having a first valve operator rotatable about an axis extending transversely of said first axial passage,
        a portion of said first end of said mandrel means defining a first recess for housing said first valve operator whereby said first valve operator is accessible from the exterior of said mandrel means and terminates within the outermost radial periphery of said first end of said mandrel means,
        a second rotary valve disposed in said second axial passage and having a second valve operator rotatable about an axis extending transversely of said second axial passage,
        a portion of said second end of said mandrel means defining a second recess for containing said second valve operator whereby said second valve operator is accessible from the exterior of said mandrel means and terminates within the outermost radial periphery of said first end of said mandrel means.

5. An assembly for use in obtaining samples of well fluids, said assembly comprising:
barrel means;
mandrel means disposed for axial sliding movement within said barrel means;
portions of said barrel means and said mandrel means cooperating to define isolated, fluid entrapping, chamber means;
passage means in said mandrel means adapted to provide communication between said chamber means and the exterior of said assembly; and
valve means carried by said slidable mandrel means and disposed to control flow through said passage means;
said barrel means including
generally cylindrical body means,
a first, generally cylindrical, valving sleeve spaced at least in part radially inwardly of said body means,
said first valving sleeve and said body means being so spaced as to define a first annular passage communicating with said chamber means,
first, generally radially extending, port means in said first valving sleeve communicating with said first annular passage,
a second, generally cylindrical, valving sleeve spaced at least in part radially inwardly of said body means,
said second valving sleeve and said body means being so spaced as to define a second annular passage communicating with said chamber means,
second, generally radially extending, port means in said second valving sleeve communicating with said second annular passage;
said mandrel means including
a generally axially extending, rod-like portion,
a first valving piston disposed at one end of said rod-like portion and slidably mounted within said first valving sleeve, and
a second valving piston disposed at another end of said rod-like portion and slidably mounted within said second valving sleeve,
said first valving piston, in response to axial movement of said mandrel means, being adapted to control flow through said first valving sleeve from said first radial port means, and
said second valving piston, in response to axial movement of said mandrel means, being adapted to control flow through said second valving sleeve from said second radial port means;
said chamber means including a generally annular cavity disposed between an exterior portion of said mandrel means and an interior portion of said barrel means;
said passage means including
a first axial passage extending generally axially of and located at a first end of said mandrel means and communicating with the exterior of said mandrel means at said first end,
first, generally transversely extending, passage means extending between said first axial passage and said chamber means,
a second axial passage extending generally axially of and located at a second end of said mandrel means and communicating with the exterior of said mandrel means at said second end, and
second, generally transversely extending, passage means extending between said second axial passage and said chamber means; and
said valve means including
a first rotary valve disposed in said first axial passage and having a first valve operator rotatable bout an axis extending transversely of said first axial passage,
a portion of said first end of said mandrel means defining a first recess for housing said first valve operator whereby said first valve operator is accessible from the exterior of said mandrel means and terminates within the outermost radial periphery of said first end of said mandrel means,
a second rotary valve disposed in said second axial passage and having a second valve operator rotatable about an axis extending transversely of said second axial passage,
a portion of said second end of said mandrel means defining a second recess for containing said second valve operator whereby said second valve operator is accessible from the exterior of said mandrel means and terminates within the outermost radial periphery of said first end of said mandrel means.

6. An assembly as described in claim 5, said assembly further including:
first cap means secured to one end of said barrel means and engaging one end of said mandrel means;
second cap means mounted on a second end of said barrel means and engaging a second end of said mandrel means;
said first and second cap means, respectively, having generally radially extending, first and second port means providing access, respectively, to said first and second valve operators; and
said first and second cap means, respectively, having axially extending first and second passageways extending, respectively, from said first and second axial passages of said mandrel means.

References Cited

UNITED STATES PATENTS

| | | | |
|---|---|---|---|
| 2,661,802 | 12/1953 | Johnston | 166—165 X |
| 3,285,344 | 11/1966 | Jensen | 166—165 X |
| 3,308,882 | 3/1967 | Lebourg | 166—150 X |
| 3,308,887 | 3/1967 | Nutter | 166—150 |

ERNEST R. PURSER, *Primary Examiner.*

D. H. BROWN, *Examiner.*